US006873902B2

(12) United States Patent
Welch

(10) Patent No.: US 6,873,902 B2
(45) Date of Patent: Mar. 29, 2005

(54) NON-INTRUSIVE METHOD OF MEASURING ENGINE OPERATING PARAMETERS

(75) Inventor: William Welch, Mountain View, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 46 days.

(21) Appl. No.: 10/397,289

(22) Filed: Mar. 27, 2003

(65) Prior Publication Data

US 2004/0193359 A1 Sep. 30, 2004

(51) Int. Cl.⁷ .............................................. G06F 19/00
(52) U.S. Cl. ...................... 701/111; 701/114; 324/379; 73/116
(58) Field of Search ............................... 701/111, 114; 324/379, 395; 73/116

(56) References Cited

U.S. PATENT DOCUMENTS

| | | | | |
|---|---|---|---|---|
| 4,872,257 A | * | 10/1989 | Wakamori et al. | ............. 29/701 |
| 5,065,507 A | * | 11/1991 | Wakamori et al. | .......... 29/888.1 |
| 5,517,311 A | * | 5/1996 | Takeuchi et al. | ............. 356/606 |
| 5,922,948 A | | 7/1999 | Lesko et al. | |
| 6,389,561 B1 | | 5/2002 | Bluvband | |

FOREIGN PATENT DOCUMENTS

| EP | 0 473 079 A2 | 3/1992 |
|---|---|---|
| JP | 62 010473 A | 1/1987 |

* cited by examiner

*Primary Examiner*—John T. Kwon
(74) *Attorney, Agent, or Firm*—McDermott Will & Emery LLP

(57) ABSTRACT

Methods and devices for measuring and calculating various kinds of parameters of a running engine are disclosed. A camera may be positioned to capture a plurality of images of a moving component that is being driven by the an engine. From the plurality of images, a velocity of the moving component may be measured, and an acceleration then derived. From the derived acceleration, various parameters of the running engine may be calculated, including but not limited to, number of firing cylinders, rotational rate, and relative cylinder balance. These and other parameters may then be reported, such as through a display screen, to a user. The methods and devices disclosed herein may also generate recommendations for specific kinds of maintenance to an engine based on the results of parameter measurements and calculations, then report those recommendations to a user.

31 Claims, 3 Drawing Sheets

NON-INTRUSIVE METHOD OF MEASURING ENGINE OPERATING PARAMETERS

BACKGROUND

1. Field

The disclosures herein relate to combustion engines, and methods and devices for measuring their physical operating parameters. More specifically, the disclosures relate to non-intrusive methods and devices for measuring the operating parameters of a piston driven combustion engine while it is running.

2. General Background and State of the Art

Combustion engines are driven by pistons that move as the result of explosions within sealed chambers, or cylinders. Typically, combustion engines utilize a plurality of cylinders to generate sufficient energy. Each cycle of the engine is defined by a sequence of cylinder firings. Because it is desirable for an engine to produce a stable level of energy throughout each cycle, it is necessary that the cylinders of a combustion engine fire at substantially regular intervals. It is also necessary that they all produce substantially similar levels of energy. Should one cylinder be off balance, such as by firing at the wrong time or by producing too much or too little energy, the engine may not operate efficiently or smoothly.

Therefore, it is helpful to have methods for diagnosing cylinder balance problems within an engine. However, due to the mechanical complexity of piston driven combustion engines, accessing individual cylinders for inspection and analysis may be tedious. Moreover, the very nature of a piston's operation and the variety of moving parts associated with an engine can cause close inspection of the cylinders to be a dangerous undertaking. Therefore, certain methods for detecting cylinder balance problems have been developed, in which direct access to the engine's cylinders is not required. For example, some known methods involve monitoring the electrical output of an alternator for deviations that might be caused by an cylinder imbalance. However, such methods are still fairly tedious in that they involve direct access to the alternator, which may not always be easily accessible. These methods also involve direct electrical connections to the alternator, which could both be tedious and run the risk of introducing an electric short or other malfunction to other equipment or systems that are housed in proximity to the engine.

SUMMARY

The methods and devices disclosed herein help solve these and other problems by providing a non-intrusive means of measuring and calculating a variety of operating parameters of a combustion engine, including cylinder balance, while it is running. Also provided are methods for displaying these operating parameters to a user, and calculating recommended courses of action, also reportable to the user.

In one aspect, at least one parameter of a rotating combustion engine containing a plurality of cylinders is measured by capturing a series of images of a component moving in synchronism with the engine, extracting motion information from the series of images indicative of motion of the engine caused by the firing of at least one of the cylinders, and extracting the at least one parameter from the motion information. The parameter may be related to the firing of the cylinders and may include, for example, the number of firing cylinders, the revolutions per minute (RPM), or the cylinder balance of the engine.

In another aspect, an apparatus for measuring at least one parameter of a rotating combustion engine containing a plurality of cylinders comprises a camera configured to capture a plurality images of a component that is moving in synchronism with an engine, a computer processor in communication with the camera and configured to retrieve and process motion information from the plurality of images, and a display, configured to receive an output representing the calculated parameter from the computer processor and present it in a readable format. The processing of motion information may include calculating a parameter of the engine. The parameter may be related to the firing of the cylinders and may include, for example, the number of firing cylinders, the revolutions per minute (RPM), or the cylinder balance of the engine.

In yet another aspect, an apparatus for measuring at least one parameter of a rotating combustion engine containing a plurality of cylinders comprises a recording means for capturing a plurality of images of a component that is moving in synchronism with an engine, a processing means for retrieving and processing motion information from the plurality of images, and a display means for displaying an output representing the calculated parameter in a readable format. The means for processing may include a means for calculating a parameter of the engine. The parameter may be related to the firing of the cylinders and may include, for example, the number of firing cylinders, the revolutions per minute (RPM), or the cylinder balance of the engine.

The foregoing and other features and advantages of the present disclosure will become apparent from a reading of the following detailed description of exemplary embodiments thereof, in conjunction with the accompanying drawings.

DETAILED DESCRIPTION OF ILLUSTRATIVE EMBODIMENTS

Figure 1:
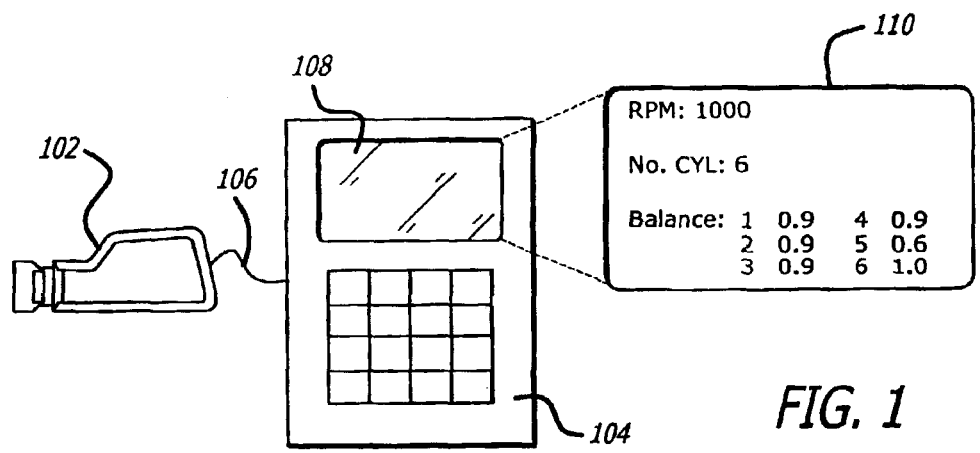
FIG. 1 illustrates an exemplary device for measuring and computing various operating parameters of a running engine, and for reporting the same to a user.

FIG. 1 illustrates an exemplary device for measuring and computing various operating parameters of a running engine, and for reporting the same to a user. The exemplary device may comprise a camera 102 or other optical sensing device. Camera 102 may record a plurality of images of a component that is moving in synchronism with a running engine, and transmit those images to a computer processor located in a computer device 104. The moving component may be connected to the engine directly, or via one or more indirect or intermediary connections. For example, the moving component may be a belt that is connected directly to a portion of the engine, or it may be a part of a subsystem, such as a fuel injection system, that is driven by the engine through a system of belts and pulleys. Computer device 104 may be a handheld unit that is easily manipulated and controlled by a mechanic or other user. Alternatively, computer device 104 may be a stand alone computer, such as a laptop or desktop computer, or other processing machine. Alternatively, computer device 104 may be located within an automobile or other vehicle that is powered by the engine. Computer device 104 may include computer processing hardware and software for receiving a plurality of images from camera 102, and retrieving and processing motion information therefrom, as described in further detail below. Image data may be transmitted from camera 102 to computer device 104 by means of a data transmitting cable 106, or by wireless transmission methods including radio or high frequency transmissions, for example. Computer device 104 may further include a display screen 108, for presenting a digital or other form readout to a user, thereby reporting results of measurements or computations to the user. Image data captured by camera 102 may be processed by computer device 104 to retrieve and calculate operating parameters of a running engine, and those parameters may then be presented to a user on display screen 108. For example, as illustrated in an expanded view 110, display screen 108 may report the RPM of a running engine, the number of firing cylinders, or the relative contribution of each cylinder to the engine's overall acceleration. Display screen 108 may be located on the computer device 104, or may be located on a separate device, such as a computer monitor attached to a stand-alone computer, or at a remote display device that the user may carry separately from computer device 104. Alternatively, display screen 108 may be located inside of an automobile or other vehicle, such as on a dashboard or control panel, while computer device 104 is located either within the vehicle, such as under the hood, or possibly outside of the vehicle, such as in a shop or garage. Also, camera 102 and computer device 104 may stand separately as individual components or may be contained together within a single device.

Figure 2:
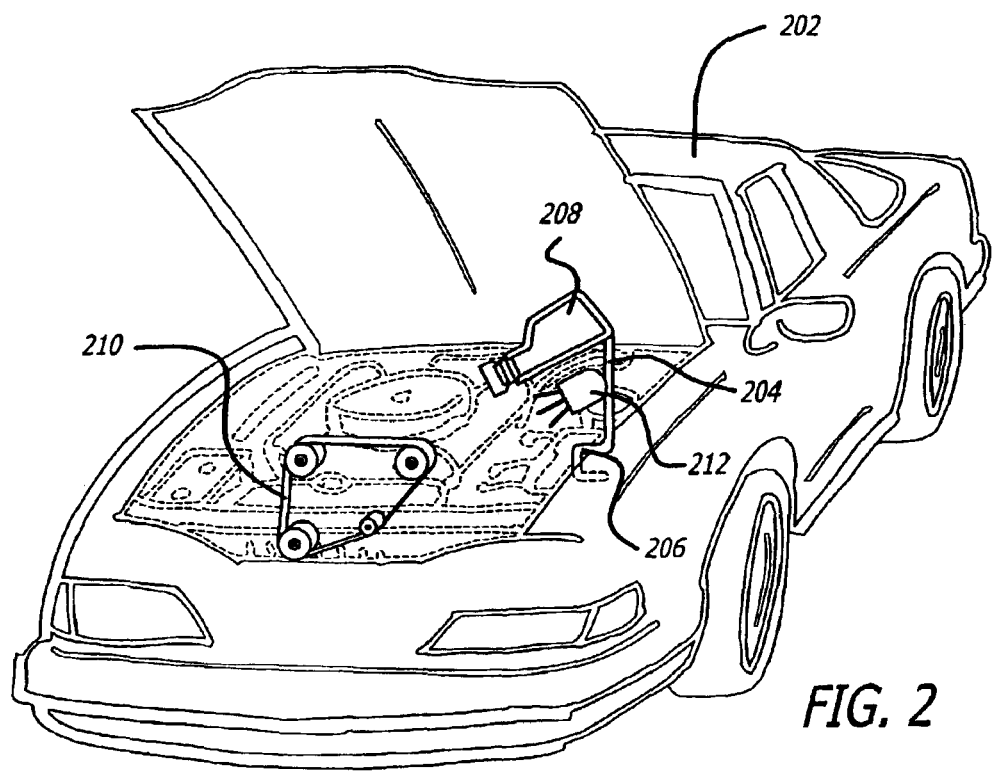
FIG. 2 illustrates an exemplary device for measuring and computing various engine operating parameters in a mounted position above the engine to be measured.

FIG. 2 illustrates an exemplary device for measuring and computing various engine operating parameters while placed in a mounted position above the engine to be analyzed. In this exemplary embodiment, the engine being analyzed is that of an automobile 202, but it is to be understood that the teachings herein extend to any combustion engine and are not limited to use with automobiles or engines for automobiles. Parts of the exemplary device are mounted on a pole or other structure 204, which may in turn be connected to a support with a clip, hook, bracket, or other fastening device 206. The exemplary device may be mounted directly to the vehicle, or may be mounted on a stand that rests on the ground next to the vehicle. Alternatively, it may be held by hand above the moving component to be imaged. A camera 208 or other optical device is positioned such that it can record a series of images of a moving component 210, such as a belt, a wheel, or some other component. The moving component is selected because it is being driven, directly or indirectly, by the engine such that it moves in synchronism therewith. Therefore, the moving component may be analyzed to determine parameters of the engine that is driving it. The moving component 210 may move at the same rate as the engine, or may move at a different rate that is dependent upon a gear ratio established by connections between the moving component 210 and the engine. A light source 212 may also be utilized to illuminate the moving component 210 if necessary for camera 208 to operate properly.

Figure 3:
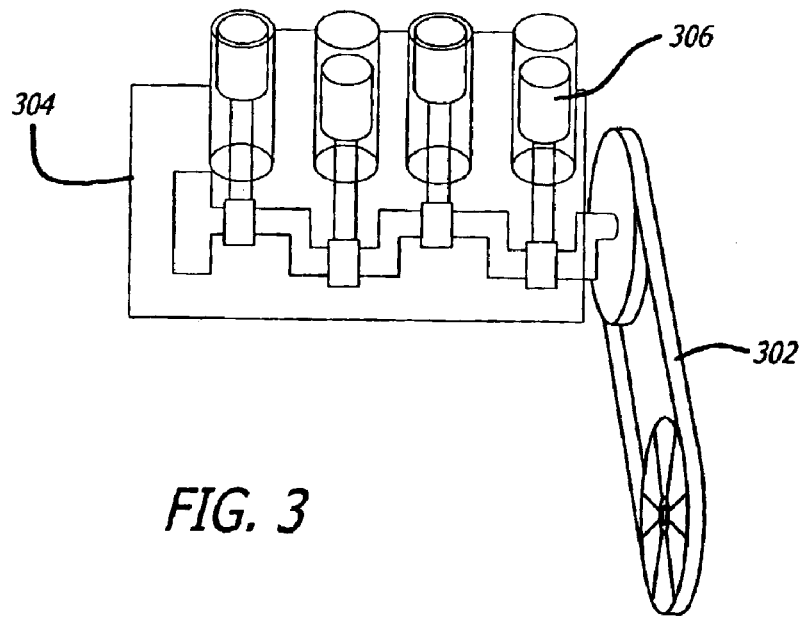
FIG. 3 illustrates a moving component attached to an engine, that may be used by methods and devices disclosed herein to measure and calculate operating parameters of the engine.

FIG. 3 illustrates an exemplary moving component attached to an engine, that may be used by methods and devices disclosed herein to measure and calculate operating parameters of the engine. As described above, a camera or other optical device may be positioned to capture a series of images of a component 302 that moves synchronously with a combustion engine 304 that is driven by one or more pistons 306. Moving component 302 should be visible to the camera and therefore may include any readily visible component that is attached, directly or indirectly, to engine 304. Moving component 302 may also include components that are not readily visible to a human eye, but that can nevertheless be sufficiently viewed and recorded by a small, agile optical device, such that a frame of sufficient size for subsequent calculations may be obtained. A sufficient frame size may be calculated as a function of the RPM of the running engine and the number of cylinders in the engine. Specifically, the frame size may be large enough such that in at least two sequential images, a singular point on the moving component is visible. Another consideration for selection and placement of the optical device may include frame speed. For example, the optical device may be selected such that images are captured at a rate that is greater than the rate of the cylinders firing in the running engine. It is to be understood that various combinations of frame speed and frame size may be utilized to capture images for extracting motion information from the component as it moves in synchronism with the running engine. It is to be further understood that because the frame size and frame speed may be calculated as functions of the RPM and number of cylinders in the engine, the selected frame size and frame speed may vary with changes in those parameters as well.

Figure 4:
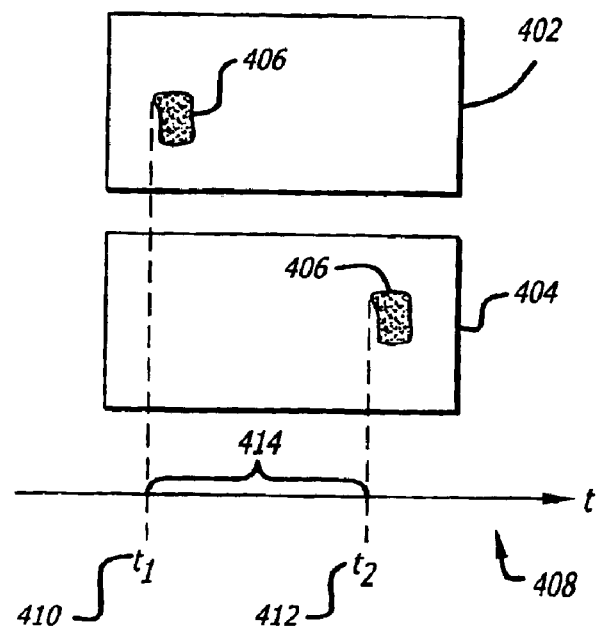
FIG. 4 illustrates an exemplary method of extracting motion information from a component that is moving in synchronism with an engine.

FIG. 4 illustrates an exemplary method of extracting motion information from a component that is moving in synchronism with an engine. As described above, an optical device is focused on a moving component and a series of images of the moving component is then recorded. The optical device is connected to a processor, such as a computer with image processing software loaded thereon, which receives the images and extracts data from them. In one embodiment, the processor may analyze the images to detect distinguishable features of the moving component. In an alternative embodiment, the optical device itself may detect and identify the distinguishable features. Such features may include, for example, the physical texture or other types of marks on the moving component. Various methodologies for distinguishing and subsequently recognizing a feature are known and readily available, and may be suitable for use with the various embodiments disclosed herein. For example, optical sensors that measure variations of noise in reflections, as commonly employed in an optical computer mouse, may be used to recognize features of the moving component's texture. Alternatively, the images may be post-processed with pattern recognition software programs. Once a feature has been identified in one image within the series of images, it can then be traced through subsequent images, and the computer may extract motion information from those images.

In one embodiment, a first image 402 of the moving component is followed by a second image 404 of the moving component. Image 404 may immediately follow image 402 within the series of images recorded by the optical device, or may be a later subsequent image within the series. A feature 406 of the moving component may be, for example, a raised bump, an indentation, a discoloration, or some other optically detectable element of the moving component's texture. During the time that elapses between the first image 402 and the second image 404, it can be seen that the feature 406 has traveled a certain distance in the direction that the moving component has traveled, as indicated at arrow 408. Specifically, feature 406 appeared at time $t_1$ 410 in the first image 402, and again at time $t_2$ 412 in the second image 404.

The elapsed time may thus be calculated as the difference between $t_1$ and $t_2$. The traveled distance of feature 406 during the elapsed time is indicated at region 414. By measuring both the traveled distance 414 and the amount of time that elapsed while feature 406 traveled over the course of that distance, motion information may be calculated to describe the moving component. For example, a simple calculation in which the traveled distance 414 is divided by the elapsed time yields an average velocity of the moving component during the elapsed time. By making multiple similar calculations for a plurality of images, a plurality of velocity data may be collected for the moving component over an extended period of time.

The velocity data may include time dependent deviations that illustrate increased velocity corresponding to cylinder firings and decreased velocity corresponding to velocity decay in the time following the maximum velocity that occurs after a cylinder firing. Peaks within the velocity data represent maximum velocity after a cylinder fires, while minimum points represent the minimum velocity that occurs through decay over time, just before the next cylinder fires to generate the next peak in the data. From these velocity data, acceleration data may also be derived, such as by calculating a first derivative of the curve fitting the velocity data. The acceleration data may also include peaks representing increasing and maximum acceleration corresponding to cylinder firings. These various data may be analyzed to obtain various parameters of the operating engine described above, including the number of firing cylinders, the RPM and the cylinder balance.

Figure 5A:
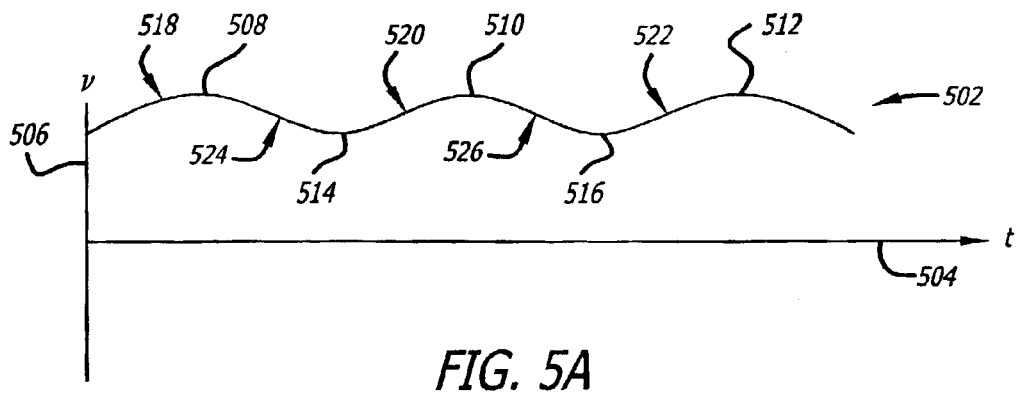
FIG. 5a illustrates exemplary velocity data obtained and analyzed by methods and devices disclosed herein.

FIG. 5a illustrates exemplary velocity data 502 obtained and analyzed by methods and devices disclosed herein. The velocity data 502 may be obtained and calculated from motion information that has been derived from a plurality of images of a moving component, as described above. Over time, which is represented by the horizontal axis 504, the amplitude of the velocity varies along the vertical axis 506. Within the velocity data 502, a series of discrete peaks 508, 510, 512 may be identified, each one having an amplitude that represents the moving component's velocity due to the firing of a cylinder. Similarly, minimum points 514, 416 indicate dampened velocity, such as after velocity decay that entails subsequent to a previously fired cylinder and before the next cylinder fires. Positive slopes 518, 520 and 522 represent increasing velocity that results when a cylinder fires. Negative slopes 524, 526 indicate decreasing velocity, which is dampened after the moving component has achieved its maximum velocity caused by a firing cylinder and before the next firing of a cylinder. Therefore, the velocity data 502 can be analyzed by first identifying discrete peaks and their corresponding positive and negative slopes, which are indicative of firing cylinders within the engine.

Figure 5B:
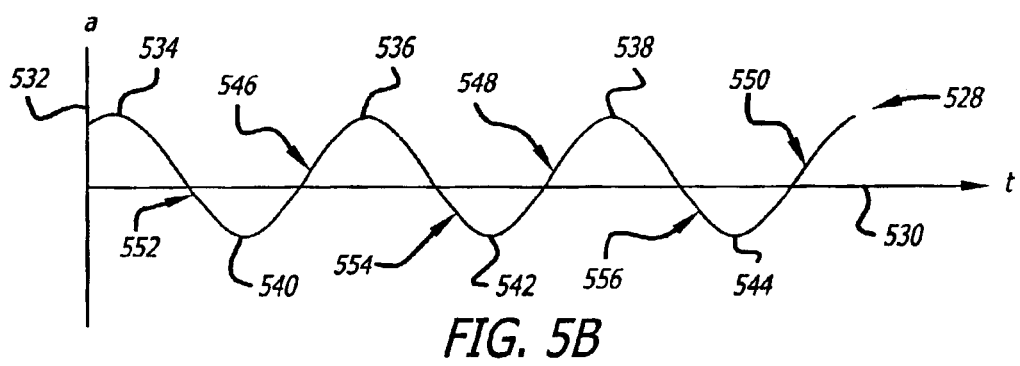
FIG. 5b illustrates exemplary acceleration data obtained and analyzed by methods and devices disclosed herein.

FIG. 5b illustrates exemplary acceleration data obtained and analyzed by methods and devices disclosed herein. The velocity data 502 described above may be processed to obtain acceleration data 504, such as by calculating a derivative of velocity data 502, for example. Peaks 534, 536 and 538 each indicate a point of maximum acceleration, thereby indicating a firing cylinder. Alternatively, minimum points 540, 542 and 544 indicate points of maximum negative acceleration, caused by the acceleration decay after a cylinder has fired and the moving component has slowed its velocity. Also, positive slopes 546, 548 and 550 represent increasing acceleration caused by a firing cylinder, while negative slopes 552, 554 and 556 represent decreasing acceleration as the moving component slows down before the next cylinder fires.

Upon inspection of the velocity or acceleration data, unique signatures may be identifiable for one or more of the firing cylinders. Although each cylinder within the engine may be operating at a similar level and thereby result in velocity or acceleration data that comprises relatively uniform peaks, it is possible that one cylinder is firing with a strength that deviates noticeably from that of the other cylinders. In that case, a peak of noticeably different amplitude may appear among other "normal" peaks within the data. For example, a cylinder firing with abnormally increased strength may have a greater amplitude than the other cylinders. On the other hand, a cylinder that exerts a weaker force or is simply not functioning may be reflected by a decreased amplitude, or an amplitude notch, that is noticeably different from the rest of the data, which include peaks at "regular" intervals. In either case, the "abnormal" point in the data serves as a signature indicative of a cylinder that is not properly functioning. The signature may be traced through a series of engine rotations for the purpose of calculating various engine parameters, as will be described in further detail below.

Figure 6:
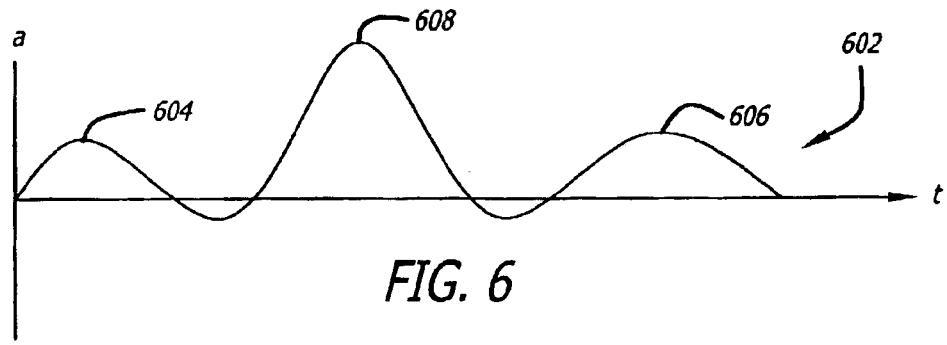
FIG. 6 illustrates exemplary acceleration data including an exemplary unique signature.

FIG. 6 illustrates the concept of a signature, wherein the signature represents a cylinder that produces greater than average acceleration when it fires. The acceleration data 602 comprises normal peaks 604 and 606 that have substantially similar amplitudes. If extrapolated over additional time, the acceleration data 602 would include regularly repeating acceleration peaks having amplitudes substantially similar to that of peaks 604 and 606. Each of these peaks would represent a discrete cylinder firing. However, the amplitude of each of these peaks may be too similar to one another to distinguish any one of them. Yet, if one cylinder produces more power when it fires than the others, it may cause the moving component to experience a greater acceleration than the other cylinders do. Then, acceleration data 602 would reflect a larger peak 608 after this cylinder fires. Because peak 608 is identifiably different from the other peaks, it has a unique signature. This signature can be tracked through multiple engine cycles, and used to facilitate the various engine parameter calculations described below.

Figure 7:
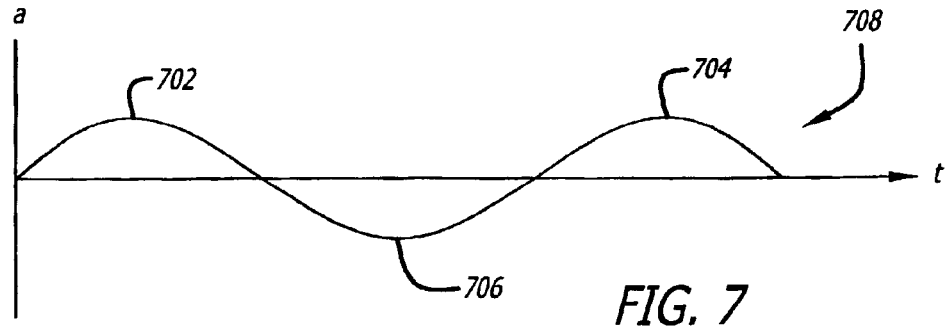
FIG. 7 illustrates exemplary acceleration data including an alternative unique signature.

FIG. 7 illustrates exemplary acceleration data including an alternative unique signature caused by a cylinder that is not firing. Such a situation may occur, for example, if the cylinder's spark plug is broken or has otherwise failed. Alternatively, it may be achieved by purposely disconnecting a single spark plug, such as if a unique signature cannot otherwise be detected. In the case where a unique signature cannot be detected, it is useful to alter or disengage one cylinder from the engine, so that the resultant unique signature (e.g. absence of a peak in various forms of motion information) may be used for analysis of the data and subsequent operating parameter calculations. At peaks 702 and 704 it can be seen that a maximum acceleration has been attained due to two discrete cylinder firings. However, between peak 702 and peak 704 is an apparent absence of a firing cylinder, as indicated at region 706. In such a case, region 706 may suffice as a unique signature. When extrapolated through several cycles of the engine, the acceleration data 708 would comprise a regularly repeating series of peaks indicating cylinder firings, although once within each of the cycles an absence of a peak, at 706, would be detected. Because the absence of a peak, at 706, is detected where an actual peak would otherwise be suspected, this region of data 706 comprises a unique signature that may be used for the various parameter calculations described below.

Patterns in the velocity and acceleration data described above may be analyzed in various ways to obtain information about the engine, including the calculation of various operating parameters. As described above, discrete peaks within acceleration or velocity data may each indicate the firing of a cylinder in the engine. These peaks may be analyzed, and resultant calculations may then be performed to determine various operating parameters of the engine. For example, the number of firing cylinders in the engine may be counted by first identifying one unique signature, then counting the number of discrete peaks that appear within any one cycle bounded by the unique signature. Additionally, by measuring the length of time that elapses during each period of the periodically repeated unique signature, the RPM of the engine may be easily calculated. For example, if a unique signature repeats every "x" number of seconds, where "x" normally is a small fraction, then a rotation of the engine occurs every "x" number of seconds. This ratio, of cycles per second or one cycle per "x" seconds, may then be multiplied by a factor of 60 seconds per minute, such that the RPM of the engine is "60(1/x)" RPM.

A related parameter that can also be derived from analysis of velocity or acceleration data is the cylinder balance of the engine. For example, the relative contribution of each cylinder to the engine's overall acceleration output may be determined by calculating the relative acceleration of each individual cylinder. First, the amplitudes of the peaks within one or more cycles of the engine are measured, and an average engine acceleration is calculated. Also, each cylinder is uniquely identified relative to its position in relation to the cylinder that produces a unique signature. For example, the cylinder that produces a unique signature may be numbered first for purposes of identification, and each other cylinder may be sequentially numbered thereafter as its peak is produced in the motion data. Next, the acceleration of each cylinder is measured. The acceleration of each cylinder may be measured for only one cycle of the engine, or an average acceleration may be calculated for each cylinder according to its acceleration data over a plurality of engine cycles. Then, the acceleration of each cylinder is compared to the average engine acceleration. The comparison may comprise an absolute comparison between the acceleration values, or it may be a percentage calculation, such that the contribution of each cylinder is determined as a percentage of the average engine acceleration. In that case, some cylinders may contribute slightly greater than 100% of the average engine acceleration, while others may contribute slightly less than that. By determining the average contribution of each cylinder to the overall average engine acceleration, it can be determined whether one or more cylinders are out of balance, therefore indicating that further inspection or repair may be necessary.

In one embodiment, further inspection or repair of a particular cylinder may be determined and then suggested to a user of the methods and devices herein. For example, if a threshold value may be determinative of whether further inspection or repair is required, such that if the contribution of one cylinder deviates from the average engine acceleration by more than the threshold value, the cylinder is identified as needing further inspection or repair. The deviation may be either above or below the average engine acceleration to indicate that further action should be taken. The threshold value may be a default setting within devices disclosed herein, and may also be determined and set by users of the devices and methods. For example, an auto mechanic may be concerned should any one cylinder of an automobile engine contribute only 90% or less of the average engine acceleration. In that case, the mechanic would set the threshold value at 10%, and any cylinder deviating by more than 10% of the average acceleration will be automatically reported to the mechanic, such as on a display screen of a device embodiment. Also, such a threshold value may be a default setting within an automobile itself. The methods taught herein may be used continually or at discrete times by systems of the automobile while it is in use. At any time, should the automobile systems detect that a cylinder is deviating from the average engine acceleration by more than the threshold amount, that deviation and the identified cylinder may be reported to the automobile driver, such as on a visual display on the dashboard. The report may include identification of the suspect cylinder, as well as its relative acceleration contribution and the overall average engine acceleration. The report thus serves to both inform the driver of a problem, as well as to provide detailed information to the driver and an auto repair expert. Moreover, methods of the present disclosures may include generation of a recommended course of action, and presentation of the recommended course to the driver or auto repair expert. For example, in the case that a cylinder fails to fire, exemplary methods described herein may include determining that a spark plug associated with the non-firing cylinder be replaced, and reporting the recommendation to a user of the system employing these methods.

Of course it is to be understood that other portions of the data may be measured and analyzed, and that calculation of various engine parameters is not limited to measurement of maximum points within the data. For example, abnormal timing or misfiring cylinders may be apparent if a peak is off center as compared with the other peaks in the data. Moreover, amplitude need not be measured at the highest or lowest point; rather, it might be measured at a uniform point along the positive or negative slope within each cylinder's signature.

Also, while the specification describes particular embodiments, those of ordinary skill can devise variations without departing from the disclosed concepts. For example, the embodiments described herein may include or be utilized with any appropriate voltage source, such as a battery, an alternator and the like, providing any appropriate voltage, such as about 12 Volts, about 42 Volts and the like.

The embodiments described herein may be used with any desired system or engine. Those systems or engines may comprise items utilizing fossil fuels, such as gasoline, natural gas, propane and the like, electricity, such as that generated by battery, magneto, solar cell and the like, wind and hybrids or combinations thereof. Moreover, those systems or engines may be incorporated into another system, such as an automobile, a truck, a boat or ship, a motorcycle, a generator, and airplane and the like.

I claim:

1. A method for measuring at least one parameter of a combustion engine containing a plurality of cylinders, the at least one parameter being related to firing of the cylinders, the method comprising:

capturing a series of images of a component moving in synchronism with the engine;

extracting motion information from the series of images indicative of motion of the engine caused by the firing of at least one of the cylinders; and extracting the at least one parameter from the motion information.

2. The method of claim 1, wherein the extracting motion information comprises:

identifying the position of a feature on the moving component that appears in a first one of the series of images;

identifying the position of the feature within a subsequent one of the series of images;

determining the time between the first image and the subsequent image; and determining the distance between the position of the feature in the first and subsequent images.

3. The method of claim 1, wherein:

the parameter includes the number of cylinders in the engine;

the motion information includes a plurality of peaks representing the firing of the cylinders; and the extracting of the parameter comprises:
a) identifying a unique signature that periodically repeats within the motion information;
b) counting the number of peaks in the motion information that are within each cycle of the original periodic signature; and
c) reporting the counted number as the number of cylinders in the engine.

4. The method of claim 3, wherein the unique signature comprises at least one of the peaks having an amplitude that deviates from an average amplitude of the plurality of peaks by an amount greater than a threshold value.

5. The method of claim 3, wherein the motion information is indicative of the acceleration of the engine caused by the firing of each cylinder.

6. The method of claim 1, wherein:
the parameter includes the rotational rate of the engine; and
the extracting of the parameter comprises:
a) identifying a unique signature that periodically repeats within the motion information;
b) measuring an elapsed amount of time within at least one cycle of the periodic signature; and
c) calculating the rotational rate of the engine as a function of the elapsed amount of time.

7. The method of claim 6, wherein the unique signature comprises at least one of the peaks having an amplitude that deviates from an average amplitude of the peaks by an amount greater than a threshold value.

8. The method of claim 6, wherein the motion information is indicative of an acceleration of the engine caused by the firing of each cylinder therein.

9. The method of claim 1, wherein the motion information includes acceleration data having a series of peaks indicative of an engine acceleration caused by the firing of each cylinder therein.

10. The method of claim 9, wherein:
the parameter includes information about cylinder balance; and
the extracting of the parameter comprises:
a) determining the average acceleration caused by the firing of the cylinders; and
b) reporting the relative acceleration caused by at least one cylinder in comparison to the average acceleration.

11. The method of claim 10, wherein the average acceleration comprises an average value of the amplitude of each of the series of peaks in at least one cycle.

12. The method of claim 10, wherein the relative acceleration comprises a percentage of the average acceleration.

13. The method of claim 10, further comprising:
identifying a cylinder whose relative acceleration deviates from the average acceleration by an amount greater than a threshold amount; and
reporting the relative acceleration of the identified cylinder.

14. The method of claim 1, wherein the engine comprises an automobile engine.

15. The method of claim 1, further comprising:
identifying a problem with the engine that relates to the extracted parameter;
determining a solution to the problem; and
reporting the solution to a user.

16. An apparatus for measuring at least one parameter of a rotating combustion engine containing a plurality of cylinders, comprising:
a camera configured to capture a plurality of images of a component that is moving in synchronism with an engine;
a computer processor in communication with the camera and configured to retrieve and process motion information from the plurality of images, and to calculate a parameter of the engine based on the motion information, wherein the motion information is indicative of motion of the engine caused by the firing of at least one of the cylinders;
a display, operably connected to the computer processor and configured to receive an output therefrom, the output comprising the calculated parameter; and
the display further configured to present the calculated parameter in a readable format.

17. The apparatus of claim 16, further comprising a light source configured to be directed toward the moving component.

18. The apparatus of claim 16, wherein the retrieving motion information from the plurality of images comprises:
identifying the position of a feature on the moving component that appears in a first one of the series of images;
identifying the position of the feature within a subsequent one of the series of images;
determining the time between the first image and the subsequent image; and
determining the distance between the position of the feature in the first and subsequent images.

19. The apparatus of claim 18, wherein the processing of the motion information comprises calculating velocity data as a function of time, the velocity data including peaks indicative of the firing of the cylinders.

20. The apparatus of claim 18, wherein the processing of the motion information comprises calculating acceleration data as a function of the time, the acceleration data including peaks indicative of the firing of the cylinders.

21. The apparatus of claim 18, wherein the parameter comprises a number of cylinders operating within the engine.

22. The apparatus of claim 18, wherein the parameter comprises a rotational rate of the engine.

23. The apparatus of claim 18, wherein the parameter comprises a relative acceleration contribution of each one of a plurality of cylinders operating within the engine to the calculated acceleration.

24. An apparatus for measuring at least one parameter of a rotating combustion engine containing a plurality of cylinders, comprising:
a recording means for capturing a plurality of images of a component that is moving in synchronism with an engine;
a processing means for retrieving and processing motion information from the plurality of images, and to calculate a parameter of the engine based on the motion information, wherein the motion information is indicative of motion of the engine caused by the firing of at least one of the cylinders; and
a display means for displaying an output representing the calculated parameter in a readable format.

25. The apparatus of claim 24, further comprising an illumination means for illuminating the moving component.

26. The apparatus of claim 24, wherein the processing means comprises:
a recognition means for identifying the position of a feature on the moving component that appears in a first one of the series of images;
the recognition means further for identifying the position of the feature within a subsequent one of the series of images;
a timing means for determining the time between the first image and the subsequent image; and the processing means further for determining the distance between the position of the feature in the first and subsequent images.

27. The apparatus of claim 26, wherein the processing means is further for calculating velocity data as a function of time, the velocity data including peaks indicative of the firing of the cylinders.

28. The apparatus of claim 26, wherein the processing means is further for calculating acceleration data as a function of the time, the acceleration data including peaks indicative of the firing of the cylinders.

29. The apparatus of claim 26, wherein the parameter comprises a number of cylinders operating within the engine.

30. The apparatus of claim 26, wherein the parameter comprises a rotational rate of the engine.

31. The apparatus of claim 26, wherein the parameter comprises a relative acceleration contribution of each one of a plurality of cylinders operating within the engine to the calculated acceleration.

* * * * *